(12) United States Patent
Atashbahar et al.

(10) Patent No.: US 11,949,493 B2
(45) Date of Patent: Apr. 2, 2024

(54) MOBILE TERMINAL AND METHODS OF USE

(71) Applicant: Hughes Network Systems, LLC, Germantown, MD (US)

(72) Inventors: Sattar Atashbahar, San Diego, CA (US); Raymond Gamboa, San Diego, CA (US); Mani Jodat, Germantown, MD (US); Juerg Widmer, San Diego, CA (US); Bill Whitmarsh, San Diego, CA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 66 days.

(21) Appl. No.: 17/555,940

(22) Filed: Dec. 20, 2021

(65) Prior Publication Data
US 2023/0198609 A1   Jun. 22, 2023

(51) Int. Cl.
*H04B 7/185* (2006.01)

(52) U.S. Cl.
CPC ................ *H04B 7/18513* (2013.01)

(58) Field of Classification Search
CPC ........... H04B 7/18513; H04B 7/18528; H04W 36/08; H04W 84/06
See application file for complete search history.

(56) References Cited

U.S. PATENT DOCUMENTS

| | | |
|---|---|---|
| 5,533,062 A | 7/1996 | Liberti, Jr. et al. |
| 2001/0053192 A1 | 12/2001 | Matsu Moto et al. |
| 2003/0002595 A1* | 1/2003 | Kim ............. H04L 27/2657 375/376 |
| 2006/0068745 A1 | 3/2006 | Wei |
| 2006/0121864 A1* | 6/2006 | Rodgers .......... H04L 27/0014 455/182.1 |
| 2006/0203950 A1 | 9/2006 | Chung et al. |

(Continued)

OTHER PUBLICATIONS

International Search Report and Written Opinion dated Apr. 10, 2023 in corresponding International Application No. PCT/US22/53390.

*Primary Examiner* — Fred A Casca
(74) *Attorney, Agent, or Firm* — GLOBAL IP COUNSELORS, LLP (57) ABSTRACT

A mobile terminal and its methods of use are disclosed herein. In an embodiment, a mobile terminal for enabling radio communications includes a common reference device, frequency conversion circuitry, and pilot tracking circuitry and/or signal tracking circuitry. The common reference device provides a common reference signal for frequency conversions. The frequency conversion circuitry uses the common reference signal from the common reference device to perform a frequency conversion of incoming or outgoing communications. The pilot tracking circuitry determines a frequency error based on a frequency of a received pilot signal and causes an adjustment to the frequency conversion performed by the frequency conversion circuitry based on the frequency error. The signal tracking circuitry determines a frequency error signal based on the frequency of an incoming communication signal and causes an adjustment to the frequency conversion performed by the frequency conversion circuitry based on the frequency error.

20 Claims, 4 Drawing Sheets

(56) References Cited

U.S. PATENT DOCUMENTS

2006/0284661 A1* 12/2006 Zhang ................ G01R 31/3167
327/198
2009/0196274 A1 8/2009 Rimini et al.
2010/0296458 A1* 11/2010 Wala ...................... H04B 1/707
370/500
2015/0032544 A1* 1/2015 Kim ................... G06Q 30/0261
705/14.58
2019/0147227 A1* 5/2019 Ko ......................... G06V 10/44
382/118

* cited by examiner

MOBILE TERMINAL AND METHODS OF USE

BACKGROUND

Field of the Invention

The present disclosure generally relates to a mobile terminal and its methods of use. In particular, the present disclosure relates to a mobile terminal configured to minimize frequency errors during mobile radio communications.

Background Information

Satellite systems are used to relay communications between mobile radios beyond line of sight. In one example of such a system, a mobile radio is connected to a mobile terminal including an up/down converter which upconverts communications signals from the mobile radio to the satellite and downconverts communication signals from the satellite to the mobile radio. Frequency errors can be introduced, for example, by the transmitter, receiver or up/down converters of the mobile terminal, by satellite doppler, by doppler introduced by movement of the mobile terminal, or by other factors.

SUMMARY

The present disclosure provides a mobile terminal and methods of use which correct frequency errors to ensure successful transmission or reception of radio communications. The mobile terminal is configured to correct errors introduced from external sources, for example, by estimation and compensation using a baseband signal in a digital domain. The mobile terminal is also configured to correct errors introduced by a local oscillator due to aging, temperature or other factors, for example, by acquiring/tracking a pilot signal.

In view of the state of the known technology, one aspect of the present disclosure is to provide a mobile terminal for enabling radio communications. The mobile terminal includes a common reference device, frequency conversion circuitry, and pilot tracking circuitry. The common reference device is configured to provide a common reference signal for frequency conversions. The frequency conversion circuitry is configured to use the common reference signal from the common reference device to perform a frequency conversion of incoming or outgoing communications. The pilot tracking circuitry is configured to determine a frequency error based on a frequency of a received pilot signal and cause an adjustment to the frequency conversion performed by the frequency conversion circuitry based on the frequency error.

Another aspect of the present disclosure is to provide another mobile terminal for enabling radio communications. The mobile terminal includes a common reference device, frequency conversion circuitry, and signal tracking circuitry. The common reference device is configured to provide a common reference signal for frequency conversions. The frequency conversion circuitry is configured to use the common reference signal from the common reference device to perform a frequency conversion of incoming or outgoing communications. The signal tracking circuitry is configured to determine a frequency error based on a frequency of an incoming communication signal of an incoming communication and cause an adjustment to the frequency conversion performed by the frequency conversion circuitry based on the frequency error.

Another aspect of the present disclosure is to provide another mobile terminal for enabling radio communications. The mobile terminal includes a common reference device, frequency conversion circuitry, and frequency tracking circuitry. The common reference device is configured to provide a common reference signal for frequency conversions. The frequency conversion circuitry is configured to use the common reference signal from the common reference device to perform a frequency conversion of incoming or outgoing communications. The frequency tracking circuitry is configured to cause an adjustment to the frequency conversion performed by the frequency conversion circuitry based on a determination of a frequency error.

Also, other objects, features, aspects and advantages of the disclosed devices, systems and methods will become apparent to those skilled in the art in the field of mobile satellite systems and other communication systems from the following detailed description, which, taken in conjunction with the annexed drawings, discloses preferred embodiments of devices, systems and methods for enabling radio communications with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
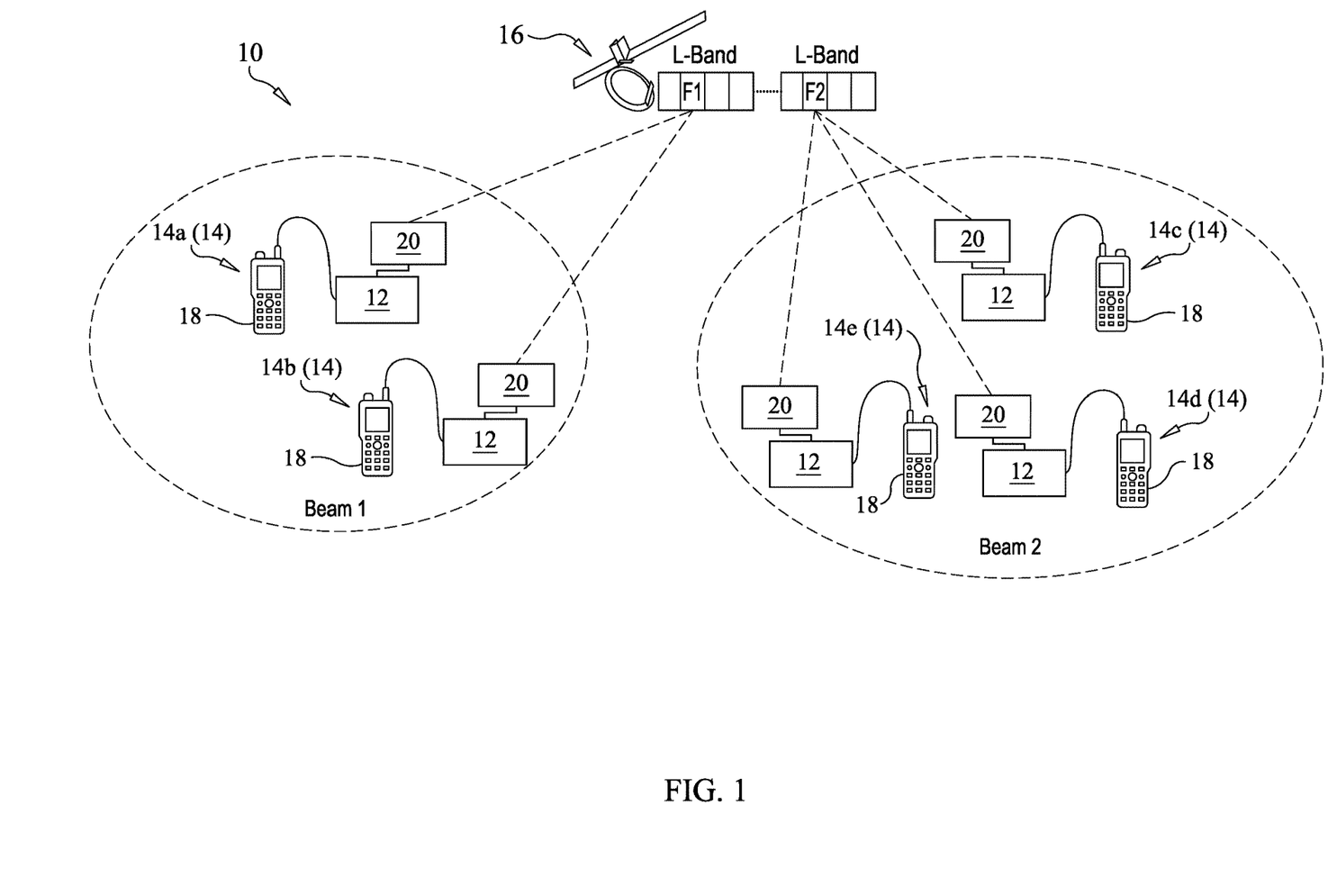
FIG. 1 illustrates an example embodiment of a system for enabling radio communications in accordance with the present disclosure.

FIG. 1 illustrates an example embodiment of a system 10 for enabling radio communications in accordance with the present disclosure. In the illustrated embodiment, the system 10 is an over-the-horizon system for tactical radio communications, for example, via an intermediate communication device (e.g., a mobile satellite or high altitude platform station) or terrestrial microwave. The system 10 includes and is enabled by at least one mobile terminal 12. In the illustrated embodiment, the system 10 includes a plurality of mobile terminals 12.

In the illustrated embodiment, the system 10 includes a plurality of radio units 14. In FIG. 1, the plurality of radio units 14 includes a first radio unit 14a operated by a first user, a second radio unit 14b operated by a second user, a third radio 14c unit operated by a third user, a fourth radio unit 14d operated by a fourth user, and a fifth radio unit 14e operated by a fifth user. The first radio unit 14a and the second radio unit 14b are located in Beam 1 of a satellite 16 and communicate with the satellite 16 using a first transmission frequency F1, while the third radio 14c, the fourth radio unit 14d, and the fifth radio unit 14e are located in Beam 2 of the satellite 16 and communicate with the satellite 16 using a second transmission frequency F2. The system 10 is advantageous, for example, for enabling communications between a user located in Beam 1 and a user located in Beam 2.

In the illustrated embodiment, the system 10 includes an intermediate communication device. In FIG. 1, the intermediate communication device includes at least one satellite 16. In a more complex embodiment, the system 10 includes a plurality of satellites 16. In alternative embodiments, the intermediate communication device can include one or more high altitude platform station or the mobile terminals 12 can communicate via terrestrial microwaves. The satellite 16 communicates with the radio units 14 over a radio frequency link, such as an L-band link, an S-band link, or any other suitable type of link as understood in the art. The satellite 16 enables communications between the radio units 14 over a plurality of transmission frequencies (including the first transmission frequency F1, the second transmission frequency F2, etc.). The beams (e.g., Beam 1, Beam 2, etc.) are propagated from the satellite 16. As will be understood by those of ordinary skill in the art from this disclosure, each satellite 16 in a satellite communication network propagates at least one beam onto a specific region of the earth. The beam creates a coverage area for the satellite 16. An antenna or satellite dish located within the beam is enabled for satellite communications via the satellite 16 propagating the beam.

In FIG. 1, each radio unit 14 includes a mobile terminal 12, a mobile radio 18 and an antenna 20. The mobile radio 18 can be a UHF, VHF or other type of mobile radio configured to send and/or receive communications using one or more mobile frequency. An advantage of the mobile terminal 12 disclosed herein is that various types of mobile radios 18 can be connected to the mobile terminal 12 and used in accordance with the present disclosure. For example, the system 10 enables UHF, VHF and other types of radios to be compatible and communicate with each other over the horizon. The mobile terminal 12 used for each radio unit 14 is configured to convert a mobile frequency used by a mobile radio 18 to a transmission frequency for outgoing communications to the satellite 16, and likewise to convert the transmission frequency to the mobile frequency used by the mobile radio 18 for incoming communications from the satellite 16. As used herein, a "mobile frequency" refers to a frequency used by the mobile radio 18 for communications, while a "transmission frequency" refers to a frequency used to transmit outgoing communications from the mobile terminal 12 (e.g., to the satellite 16) and/or receive incoming communications to the mobile terminal 12 (e.g., from the satellite 16). In an embodiment, the mobile frequency is in a VHF or UHF frequency range, while the transmission frequency is in an L-band or S-band frequency range.

The antenna 20 is configured to send and/or receive communications to or from the satellite 16. More specifically, the antenna 20 is configured to communicate with the satellite 16 using transmission frequencies. The antenna 20 can be an active antenna or a passive antenna. The type of antenna 20 will vary depending on how the mobile terminal 12 is used in the field. An advantage of the mobile terminal 12 disclosed herein is that it can be connected to different types of mobile radios 18 and antennas 20 and used in a wide variety of applications. The antenna 20 can be an existing antenna known to those of ordinary skill in the art.

Figure 2:
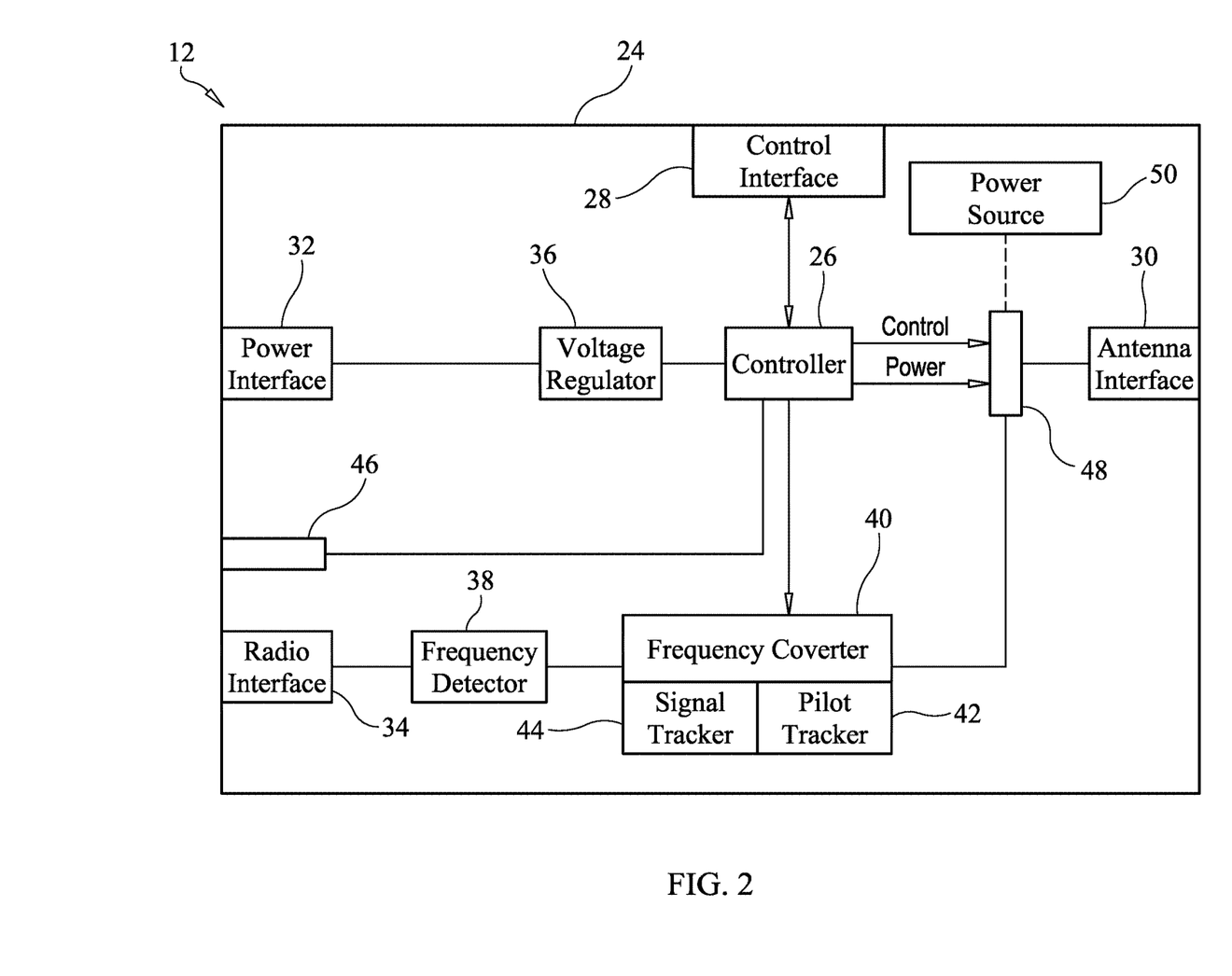
FIG. 2 illustrates a schematic diagram of an example embodiment of the components of a mobile terminal in accordance with the present disclosure.

FIG. 2 illustrates an example schematic diagram of a mobile terminal 12. In the illustrated embodiment, the mobile terminal 12 includes a housing 24. The housing 24 can be made of any suitable material to protect the components therein. The material can vary based on the intended application of the mobile terminal 12.

The mobile terminal 12 includes a controller 26. As understood in the art, the controller 26 preferably includes a microcomputer with a control program that controls the other components as discussed herein. The controller 26 can also include other conventional components such as an input interface circuit, an output interface circuit, and storage devices such as a ROM (Read Only Memory) device and a RAM (Random Access Memory) device. The ROM and RAM store processing results and control programs that are run by the controller 26. The controller 26 is operatively coupled to the other components of the mobile terminal 12 as appropriate, in a conventional manner. It will be apparent to those skilled in the art from this disclosure that the precise structure and algorithms for the controller 26 can be any combination of hardware and software that will carry out the functions of the present disclosure.

The mobile terminal 12 includes one or more connection interfaces. For example, in the illustrated embodiment, the mobile terminal 12 includes a control connection interface 28, an antenna connection interface 30, a power connection interface 32 and/or a radio connection interface 34. The control connection interface 28 is configured to enable connection to a computer to allow a user to locally program the controller 26. In an embodiment, the mobile terminal 12 can be designed with an integral user interface for local programming. The antenna connection interface 30 is configured to enable connection to an antenna 20, for example, for reception of an incoming communication from the antenna 20 and/or transmission of an outgoing communication to the antenna 20. In an embodiment, the mobile terminal 12 can include an internal antenna instead of or in addition to an antenna 20 connected at the antenna connection interface 30. The power connection interface 32 is configured to enable connection to a power supply such as a battery. In an embodiment, the mobile terminal 12 can include an internal power supply instead of or in addition to the power supply being connected at the power connection interface 32. The radio connection interface 34 is configured to enable connection to a mobile radio 18, for example, for reception of an outgoing communication from the mobile radio 18 and/or transmission of an incoming communication to the mobile radio 18. The connections can be wired or wireless. In an embodiment, each connection interface provides a port for the respective connection to be made. Thus, in an embodiment, the housing 24 is a simple structure with ports for various connection interfaces.

In the illustrated embodiment, the mobile terminal 12 includes a voltage regulator 36. The voltage regulator 36 can be a standard voltage regulator as known in the art which is configured to ensure a steady voltage supply from a power source connected to the power connection interface 32.

In the illustrated embodiment, the mobile terminal 12 includes a frequency detector 38. The frequency detector 38 is configured to detect the current mobile frequency (e.g., UHF, VHF) of the mobile radio 18 which is connected to the radio connection interface 34.

In the illustrated embodiment, the mobile terminal 12 includes frequency conversion circuitry 40. The frequency conversion circuitry 40 is configured to use a common reference signal from a common reference device 80 to convert frequencies of incoming or outgoing communications. More specifically, the frequency conversion circuitry 40 is configured to use the common reference signal from the common reference device 80 to convert a transmission frequency (e.g., L-band, S-band, etc.) of an incoming communication to a mobile frequency (e.g., for transmission to a mobile radio 18) and to convert a mobile frequency (e.g., UHF, VHF) of an outgoing communication to a transmission frequency (e.g., for transmission to a satellite 16). An example embodiment of the frequency conversion performed by the frequency conversion circuitry 40 is discussed in more detail below with reference to FIG. 3. In an embodiment, the frequency conversion circuitry 40 includes the frequency detector 38.

In the illustrated embodiment, the frequency conversion circuitry 40 is coupled to frequency tracking circuitry 42/44. The frequency tracking circuitry 42/44 is configured to cause an adjustment to the frequency conversion performed by the frequency conversion circuitry 40 based on the determination of a frequency error. More specifically, the frequency tracking circuitry 42/44 is configured to cause an adjustment to a common reference device 80 and/or at least one frequency converter of the frequency conversion circuitry 40 based on a determination of a frequency error. In the illustrated embodiment, the frequency tracking circuitry 42/44 includes pilot tracking circuitry 42 and signal tracking circuitry 44. In alternative embodiments, the frequency tracking circuitry 42/44 can include either one or both of the pilot tracking circuitry 42 and the signal tracking circuitry 44 and/or the pilot tracking circuitry 42 and the signal tracking circuitry 44 can be structured differently than shown.

The pilot tracking circuitry 42 enables tuning of the common reference device 80 based on a pilot signal. More specifically, the pilot tracking circuitry 42 is configured to determine a frequency error of a common reference signal based on a frequency of a received pilot signal and cause an adjustment to the common reference device 80 based on the frequency error. Use of the pilot tracking circuitry 42 is discussed in more detail below with reference to FIGS. 3 and 4.

The signal tracking circuitry 44 enables tuning of the frequency conversion circuitry 40 based on an incoming communication. More specifically, the signal tracking circuitry 44 is configured to determine a frequency error based on the frequency of an incoming communication signal of an incoming communication and cause an adjustment to at least one frequency converter based on the frequency error. Use of the signal tracking circuitry 44 is discussed in more detail below with reference to FIGS. 3 and 5.

In various embodiments, the mobile terminal 12 further includes one or more light (e.g., LED) 46, one or more coupler 48, and/or one or more additional power source 50. The one or more light 46 is configured to indicate a status of the mobile terminal 12. The one or more coupler 48 is configured to couple the frequency conversion circuitry 40 to the antenna connection interface 30 and/or to connect the additional power source 50 to one or more other components of the mobile terminal 12. The additional power source 50 can be used instead of and/or in addition to the power supplied at the power connection interface 32.

Figure 3:
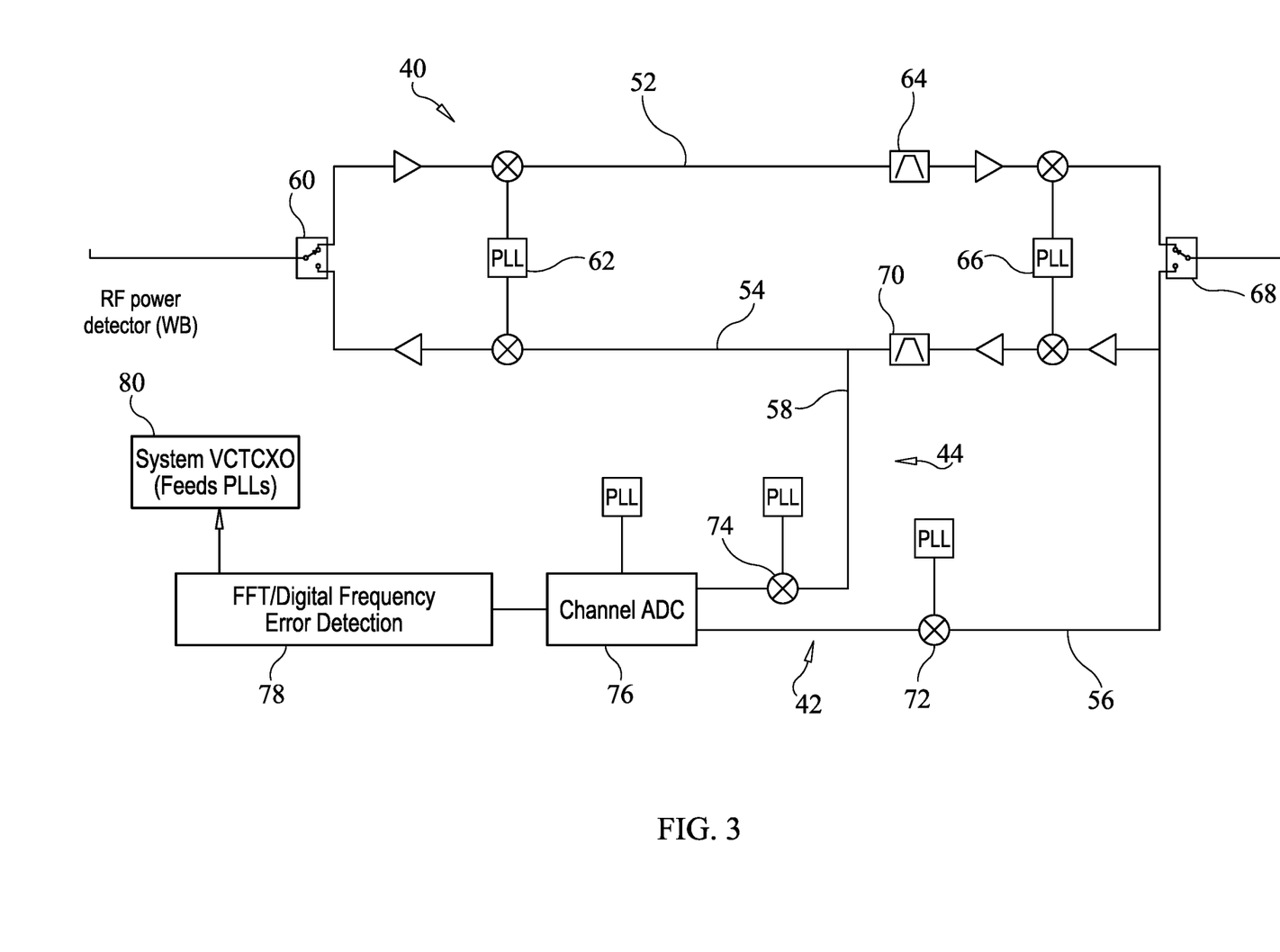
FIG. 3 illustrates a schematic diagram of an example embodiment of the circuitry of a mobile terminal in accordance with the present disclosure.

FIG. 3 illustrates an example embodiment of a high level block diagram of circuitry at the mobile terminal 12. More specifically, FIG. 3 illustrates an example embodiment of the frequency conversion circuitry 40, the pilot tracking circuitry 42 and the signal tracking circuitry 44. In an embodiment, the controller 26 is configured to adjust and/or control one or more components of the frequency conversion circuitry 40, the pilot tracking circuitry 42 and/or the signal tracking circuitry 44 based on instructions stored on its memory. Those of ordinary skill in the art will recognize from this disclosure that certain components can be shared and/or controlled by more than one of the frequency conversion circuitry 40, the pilot tracking circuitry 42 and/or the signal tracking circuitry 44. In the illustrated embodiment, the frequency conversion circuitry 40 includes one or more of a first switch 60, a first frequency converter 62, an uplink frequency filter 64, a second frequency converter 66, a second switch 68, and a downlink frequency filter 70. In the illustrated embodiment, the pilot tracking circuitry 42 includes one or more of a third frequency converter 72, a channel converter 76 and an error detector 78. In the illustrated embodiment, the signal tracking circuitry 44 includes one or more of a fourth frequency converter 74, the channel converter 76 and the error detector 78. Those of ordinary skill in the art will recognize from this disclosure that a mobile terminal 12 according to the present disclosure can have more or less components and can be configured differently.

FIG. 3 also illustrates the common reference device 80. The frequency conversion circuitry 40, the pilot tracking circuitry 42 and/or the signal tracking circuitry 44 can include the common reference device 80. The common reference device 80 is configured to provide a common reference signal for frequency conversions. In an embodiment, the common reference device 80 includes a crystal oscillator. More specifically, the common reference device 80 includes a voltage controlled temperature compensated crystal oscillator (VCTCXO). As understood by those of ordinary skill in the art from this disclosure, a crystal oscillator typically includes an electronic oscillator circuit that uses the mechanical resonance of a vibrating crystal of piezoelectric material to create an electric signal with constant frequency. The frequency can be used to keep track of time and/or stabilize frequencies for radio transmitters and receivers. A VCTCXO is a type of crystal oscillator which uses a two-port crystal resonator with a special electrode structure, which allows the VCTCXO to compensate for temperature changes and shift its oscillation frequency independently. In an embodiment, an adjustment of the control voltage to the common reference device 80 based on a determined frequency error is used to shift the oscillating frequency of the common reference device 80, thereby correcting for the determined frequency error.

In FIG. 3, the mobile frequency (e.g., VHF/UHF) at the first switch 60 and the transmission frequency (e.g., L-band) at the second switch 68 are arbitrary frequencies/channels. The mobile terminal 12 is configured to use software controlled mapping of input to output frequencies. In the illustrated embodiment, an uplink communication signal from the mobile radio 18 to the antenna 20 passes along an uplink communication signal path 52 through the first switch 60, the first frequency converter 62, the uplink frequency filter 64, the second frequency converter 66, and the second switch 68. A downlink communication signal from the antenna 20 to the mobile radio 18 passes along a downlink communication signal path 54 through the second switch 68, the second frequency converter 66, the downlink frequency filter 70, the first frequency converter 62, and the first switch

60. Although FIG. 3 illustrates a half-duplex system, the frequency conversion circuitry 40 can also be configured as a full duplex system.

The first switch 60 is configured to enable bi-directional communication at the mobile radio 18 using the mobile frequency channel selected by the user of the mobile radio 18. More specifically the first switch 60 is configured to enable the mobile radio 18 to send and/or receive communications using the mobile frequency channel selected at the mobile radio 18.

The first frequency converter 62 is configured to convert the mobile frequency sent by the mobile radio 18. More specifically, the first frequency converter 62 is configured to convert the mobile frequency sent by the mobile radio 18 to an intermediate frequency. In the illustrated embodiment, the first frequency converter 62 includes a downconverter which downconverts the mobile frequency to the intermediate frequency. In an alternative embodiment, first frequency converter 62 can include an upconverter which upconverts the mobile frequency to the intermediate frequency. In the illustrated embodiment, the first frequency converter 62 is a phase-locked loop (PLL) frequency converter. The first frequency converter 62 is configured to receive the common reference signal from the common reference device 80 for use in converting the mobile frequency. In an embodiment, the first frequency converter 62 is configured to use the common reference signal to ensure the correct conversion of the mobile frequency and/or the intermediate frequency (e.g., that the mobile frequency and/or the intermediate frequency has the correct phase). In an embodiment, the error detector 78 is configured to cause an adjustment to the first frequency converter 62 so as to adjust the frequency conversion performed by the first frequency converter 62. In an embodiment, the first frequency converter 62 includes a duplex frequency pair.

The uplink frequency filter 64 is configured to filter the uplink signal transmitted by the mobile radio 18. More specifically, the uplink frequency filter 64 is configured to pass or reject the converted intermediate frequency of the outgoing communication. The uplink frequency filter 64 is configured to pass the intermediate frequency when the intermediate frequency is a predetermined frequency. The uplink frequency filter 64 is configured to reject (not pass) the intermediate frequency when the intermediate frequency is not the predetermined frequency. In this way, the uplink frequency filter 64 prevents unwanted transmissions to the satellite 16.

The second frequency converter 66 is configured to convert the intermediate frequency of the communication sent by the mobile radio 18 to a transmission frequency, and vice versa. On the uplink side, the second frequency converter 66 converts the intermediate frequency to a transmission frequency for an outgoing communication (e.g., to the satellite 16). On the downlink side, the second frequency converter 66 converts a transmission frequency of an incoming communication (e.g., from a satellite 16) to the intermediate frequency to be transmitted to the mobile radio 18. In the illustrated embodiment, the second frequency converter 66 is a phase-locked loop (PLL) frequency converter. The second frequency converter 66 is configured to receive the common reference signal from the common reference device 80 for use in the conversion. In an embodiment, the second frequency converter 66 is configured to use the common reference signal to ensure the correct conversion of the transmission frequency and/or the intermediate frequency (e.g., that the transmission frequency and/or the intermediate frequency has the correct phase). In an embodiment, the error detector 78 is configured to cause an adjustment to the second frequency converter 66 so as to adjust the frequency conversion performed by the second frequency converter 66. In an embodiment, the second frequency converter 66 includes a duplex frequency pair.

The second switch 68 is configured to enable bi-directional communication over the radio frequency link used by the antenna 20 and satellite 16. More specifically, the second switch 68 is configured to enable the antenna 20 and satellite 16 to send and/or receive communications over the radio frequency link.

The downlink frequency filter 70 is configured to filter the intermediate signal output by the second frequency converter 66. The downlink frequency filter 70 is configured to pass the intermediate frequency when the intermediate frequency is a predetermined frequency. The downlink frequency filter 70 is configured to reject (not pass) the intermediate frequency when the intermediate frequency is not the predetermined frequency. In this way, the downlink frequency filter 70 prevents unwanted transmissions from the satellite 16 to the mobile radio 18.

The third frequency converter 72 is configured to convert the frequency of a pilot signal received from the antenna 20. In the illustrated embodiment, the pilot signal is directed to the downlink side of the second switch 68 along a pilot signal path 56 to the third frequency converter 72. The third frequency converter 72 includes a downconverter which downconverts the frequency of the pilot signal to a baseband frequency. In the illustrated embodiment, the third frequency converter 72 is a phase-locked loop (PLL) frequency converter. The third frequency converter 72 is configured to receive the common reference signal from the common reference device 80 for use in the conversion. In an embodiment, the third frequency converter 72 is configured to use the common reference signal to ensure the correct conversion of the baseband frequency (e.g., that the baseband frequency has the correct phase).

The fourth frequency converter 74 is configured to convert the frequency of an incoming communication signal of an incoming communication received by the antenna 20. In an embodiment, the incoming communication signal is intended to be transmitted to the mobile radio 18 (e.g., from the satellite 16). In the illustrated embodiment, the incoming communication signal is directed along a divergent signal path 58 to the fourth frequency converter 74. The fourth frequency converter 74 is configured to downconvert the frequency of the incoming communication signal to a baseband frequency. More specifically, the fourth frequency converter 74 is configured to downconvert the intermediate frequency of the incoming communication signal to the baseband frequency (e.g., after conversion to the intermediate frequency at the second frequency converter 66). In the illustrated embodiment, the fourth frequency converter 74 is a phase-locked loop (PLL) frequency converter. The fourth frequency converter 74 is configured to receive the common reference signal from the common reference device 80 for determining the conversion. In an embodiment, the fourth frequency converter 74 is configured to use the common reference signal to ensure the correct conversion of the baseband frequency (e.g., that the baseband frequency has the correct phase).

The channel converter 76 is configured to convert the baseband frequency. In the illustrated embodiment, the channel converter 76 is an analog-to-digital converter configured to convert the baseband frequency to at least one digital value. More specifically, the channel converter 76 is an analog-to-digital converter configured to convert the baseband frequency from an incoming communication or pilot signal to a digital value. In an alternative embodiment, the channel converter 76 can include multiple channel converters, for example, separate channel converters for an incoming communication signal and for a pilot signal.

The error detector 78 is configured to determine a frequency error. More specifically, the error detector 78 is configured to determine a frequency error based on the baseband frequency from a received communication signal or pilot signal. The error detector 78 is configured to determine a frequency error using the digital value from the channel converter 76. The error detector 78 is configured to determine the frequency error by comparing the baseband frequency to the frequency of the common reference signal (e.g., using one or more digital value from the channel converter 76). In an embodiment, the error detector 78 is configured to determine the frequency error using a fast Fourier Transform algorithm. In an embodiment, the error detector 78 is configured to determine the frequency error by centering the frequency of the incoming communication. For example, the error detector 78 can compare the center frequencies of the baseband and common reference signals.

The frequency conversion circuitry 40 is configured to use the common reference signal from the common reference device 80 to convert a mobile frequency of an outgoing communication (e.g., from a mobile radio 18) to a transmission frequency (e.g., for transmission to a satellite 16). When the mobile radio 18 transmits a communication in a mobile frequency, the first switch 60 directs the signal to the uplink communication signal path 52 of the frequency conversion circuitry 40. The first frequency converter 62 uses the common reference signal from the common reference device 80 to convert the mobile frequency to an intermediate frequency. The uplink frequency filter 64 passes the intermediate frequency if the intermediate frequency is a predetermined frequency. The second frequency converter 66 then uses the common reference signal from the common reference device 80 to convert the intermediate frequency to the transmission frequency for transmission (e.g., to the satellite 16). The second switch 68 then directs the uplink communication signal to the antenna 20 and the communication is transmitted (e.g., to the satellite 16) using the transmission frequency.

The frequency conversion circuitry 40 is also configured to use the common reference signal from the common reference device 80 to convert a transmission frequency of an incoming communication (e.g., from a satellite 16) to a mobile frequency (e.g., for transmission to a mobile radio 18). When a communication is received from the antenna 20, the second switch 68 directs the communication to the downlink communication signal path 54 of the frequency conversion circuitry 40. The second frequency converter 66 uses the common reference signal from the common reference device 80 to convert the transmission frequency back to the intermediate frequency (e.g., as stored by the PLL architecture). The downlink frequency filter 70 filters the downlink signal so that the signal passes the downlink filter 70 if the intermediate frequency is a predetermined frequency. The first frequency converter 62 uses the common reference signal from the common reference device 80 to convert the intermediate frequency to a mobile frequency (e.g., as stored by the PLL architecture). The first switch 62 then directs the downlink signal to the mobile radio 18 so that the mobile radio 18 receives the communication at the mobile frequency.

The frequency conversion circuitry 40 uses the common reference signal from the common reference device 80 to convert transmission frequencies to mobile frequencies for transmission of incoming communications and/or to convert mobile frequencies to the transmission frequencies for transmission of outgoing communications. It is therefore important for the common reference signal to be accurate.

Figure 4:
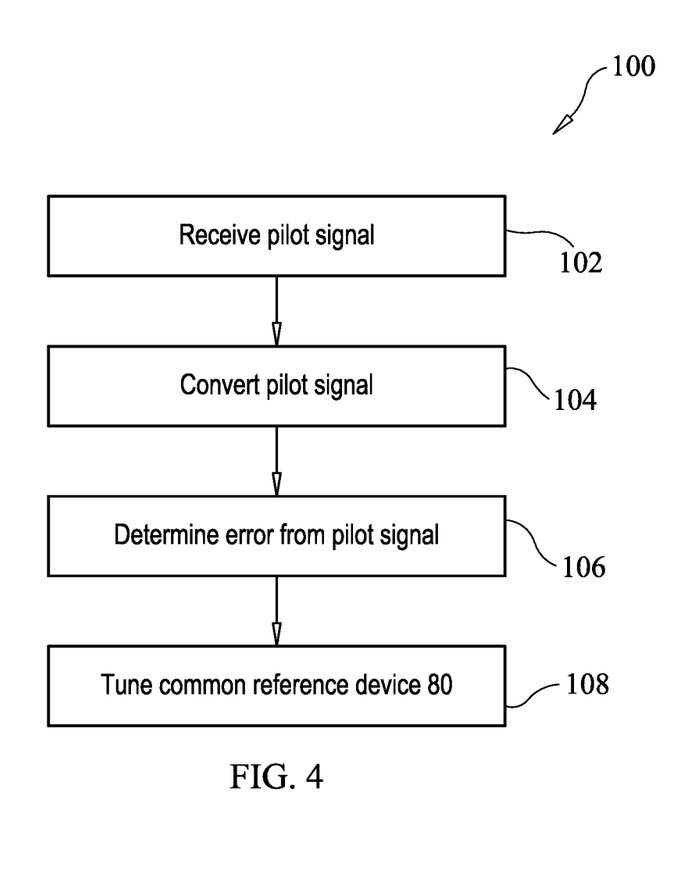
FIG. 4 illustrates an example embodiment of a method of using pilot tracking circuitry in a mobile terminal in accordance with the present disclosure.

FIG. 4 illustrates an example embodiment of a method 100 using the pilot tracking circuitry 42 to determine a frequency error based on a received pilot signal and cause an adjustment to the common reference device 80 based on the frequency error. The adjustment to the common reference device 80 causes an adjustment to the frequency conversion performed by the frequency conversion circuitry 40 which uses the common reference signal for conversions. The steps of the method 100 can be executed by the controller 26, for example, by being stored as instructions on its memory and executed by its processor. It should be understood that some of the steps described herein can be reordered or omitted without departing from the spirit or scope of the method 100.

At step 102, the mobile terminal 12 receives a pilot signal. The pilot signal is received from the intermediate communication device. In the illustrated embodiment, the pilot signal is received from the satellite 16. The antenna 20 or another antenna receives the pilot signal. The pilot signal can be at a transmission frequency (e.g., L-band, S-band). The pilot signal is directed to the pilot tracking circuitry 42. More specifically, the pilot signal is directed from the second switch 68 to the third frequency converter 72 along the pilot signal tracking path 56.

At step 104, the pilot tracking circuitry 42 converts the pilot signal. More specifically, the pilot tracking circuitry 42 converts the pilot signal to a different frequency and/or to at least one digital value. In the illustrated embodiment, the third frequency converter 72 downconverts the frequency of the pilot signal to a baseband signal. The channel converter 76 then further converts the baseband signal to at least one digital value.

At step 106, the pilot tracking circuitry 42 determines a frequency error of the common reference signal based on the pilot signal. More specifically, the error detector 78 processes the digital value output by the channel converter 76. In an embodiment, the error detector 78 processes the digital value using frequency estimation algorithms (e.g., fast Fourier transform) to determine the frequency of the pilot signal. In an embodiment, the error detector 78 can also processes an output from the common reference device 80 in the same way. The error detector 78 then compares the frequency of the pilot signal to the frequency of the common reference signal from the common reference device 80 to determine the magnitude of the difference. In an embodiment, the magnitude of the difference is the frequency error.

At step 108, the pilot tracking circuitry 42 tunes the common reference device 80 based on the determined frequency error. In the illustrated embodiment, the pilot tracking circuitry 42 causes a shift in the frequency of the common reference signal based on the magnitude of the frequency error determined by the error detector 78. In an embodiment, the pilot tracking circuitry 42 triggers an adjustment to the control voltage to the common reference device 80 based on the determined frequency error (e.g., the total error vector). By triggering an adjustment of the magnitude of the voltage applied to the common reference device 80, the pilot tracking circuitry 42 causes the common reference device 80 to shift its oscillating frequency. The pilot tracking circuitry 42 can tune the common reference device 80, for example, via the error detector 78 and/or the controller 26. The adjusted common reference signal is then fed to the first frequency converter 62, the second frequency converter 66, the third frequency converter 72, the fourth frequency converter 74 and/or the channel converter 76 for use in subsequent conversions. Thus, the frequency tracking circuitry 42 is configured to cause the adjustment to the common reference device 80 based on the frequency error such that the frequency conversion circuitry 40 uses an adjusted common reference signal to convert the frequency of subsequent incoming or outgoing communications. The adjustment to the common reference device 80 thus causes an adjustment to the frequency conversion performed by the frequency conversion circuitry 40.

The pilot tracking circuitry 42 is configured to continuously tune the common reference device 80 in accordance with the method 100. In an embodiment, the pilot tracking circuitry 42 continuously acquires/tracks one or more pilot signal from the satellite 16 and performs the method 100 at regular intervals to ensure that the common reference signal is always accurate. In this way, the pilot tracking circuitry 42 compensates for frequency errors introduced by temperature, aging and other factors over time.

Figure 5:
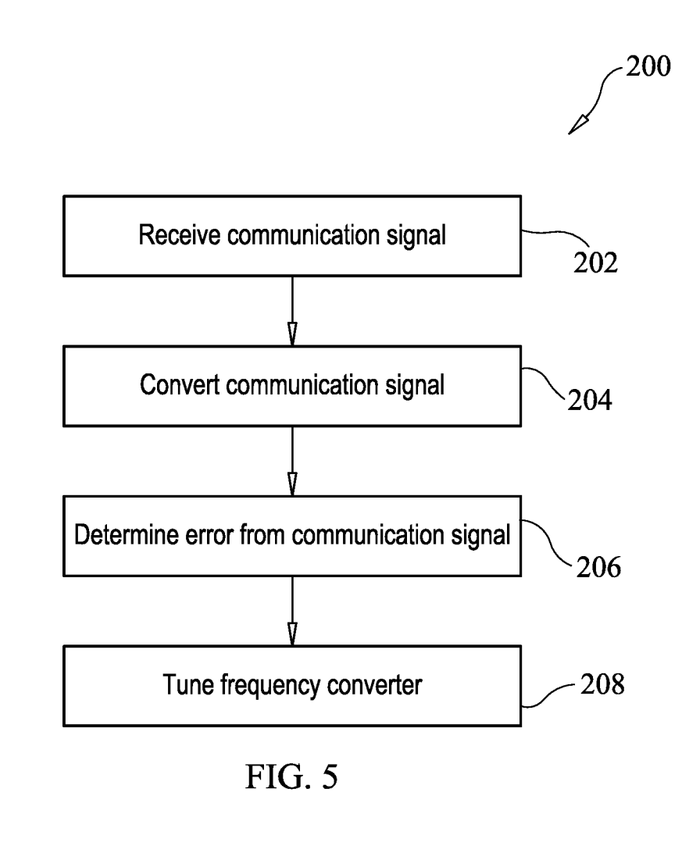
FIG. 5 illustrates an example embodiment of a method of using signal tracking circuitry in a mobile terminal in accordance with the present disclosure.

FIG. 5 illustrates an example embodiment of a method 200 using the signal tracking circuitry 44 to determine a frequency error based on the transmission frequency of an incoming communication signal of an incoming communication and cause an adjustment to the frequency conversion performed by the frequency conversion circuitry based on the frequency error. The steps of the method 200 can be executed by the controller 26, for example, by being stored as instructions on its memory and executed by its processor. It should be understood that some of the steps described herein can be reordered or omitted without departing from the spirit or scope of the method 200.

At step 202, the mobile terminal 12 receives an incoming communication. In the illustrated embodiment, the incoming communication is received from the satellite 16. The antenna 20 or another antenna receives the incoming communication. The incoming communication can be received at a transmission frequency (e.g., L-band, S-band). The incoming communication can be processed by the frequency conversion circuitry 40 as discussed herein so as to be converted to a mobile frequency for transmission to a mobile radio 18. The incoming communication signal from the incoming communication is also directed to the signal tracking circuitry 44. In the illustrated embodiment, the incoming communication signal corresponding to the incoming communication is directed from the downlink signal path 54 in the frequency conversion circuitry 40 to the fourth frequency converter 74 along the divergent signal path 58. In the illustrated embodiment, the incoming communication signal is converted to the intermediate frequency by the second frequency converter 66 before being directed to the fourth frequency converter 74 along the divergent signal path 58.

At step 204, the signal tracking circuitry 44 converts the incoming communication signal. More specifically, the signal tracking circuitry 44 converts the incoming communication signal to a different frequency and/or at least one digital value. In the illustrated embodiment, the fourth frequency converter 74 converts the incoming communication signal (e.g., in the intermediate frequency) to a baseband signal. The channel converter 76 then further converts the baseband signal to at least one digital value.

At step 206, the signal tracking circuitry 44 determines a frequency error based on the incoming communication signal. More specifically, the error detector 78 processes the digital value output by the channel converter 76. The error detector 78 processes the digital value to determine the center frequency of the incoming communication signal. The error detector 78 then compares the center frequency of the incoming communication signal to the center frequency of the common reference signal from the common reference device 80 to determine the magnitude of the difference. In an embodiment, the magnitude of the difference is the frequency error.

At step 208, the signal tracking circuitry 44 tunes the second frequency converter 66 based on the determined frequency error. In the illustrated embodiment, the signal tracking circuitry 44 shifts the center frequency of subsequent incoming communication signals based on the magnitude of the difference determined by the error detector 78. The signal tracking circuitry 44 can tune the second frequency converter 66, for example, via the error detector 78 and/or controller 26. Thus, the frequency tracking circuitry 44 is configured to cause the adjustment to the second frequency converter 66 based on the frequency error so as to tune the frequency conversion performed by the frequency conversion circuitry 40 to convert a frequency of subsequent incoming or outgoing communications.

The signal tracking circuitry 44 is configured to continuously tune the second frequency converter 66 in accordance with the method 200. In an embodiment, the signal tracking circuitry 44 performs the method 200 each time a communication is received to ensure that the frequency conversions are always accurate.

The embodiments described herein provide improved mobile terminals, systems and methods for enabling radio communications. These systems and methods are advantageous, for example, because they correct frequency errors introduced from external or local sources over time. It should be understood that various changes and modifications to the systems and methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A mobile terminal for enabling radio communications using software controlled mapping of frequencies, the mobile terminal comprising:
   a common reference device configured to provide a common reference signal for frequency conversions;
   frequency conversion circuitry configured to use the common reference signal from the common reference device to perform a frequency conversion of incoming and outgoing communications, the frequency conversion circuitry including an uplink communication signal path by which one or more outgoing communications are converted from a mobile frequency to a transmission frequency and a downlink communication signal path by which one or more incoming communications are converted from the transmission frequency to the mobile frequency, the mobile frequency being in a VHF or UHF frequency range, the transmission frequency being in an L-band or S-band frequency range; and
   pilot tracking circuitry configured to determine a frequency error based on a frequency of a received pilot signal and cause an adjustment to the frequency conversion performed by the frequency conversion circuitry based on the frequency error.

2. The mobile terminal of claim 1, wherein
the pilot tracking circuitry is configured to cause the adjustment to the frequency conversion performed by the frequency conversion circuitry by causing the adjustment to the common reference device.

3. The mobile terminal of claim 1, wherein
the pilot tracking circuitry includes an error detector configured to determine the frequency error using a fast Fourier Transform algorithm.

4. The mobile terminal device of claim 1, wherein
the pilot tracking circuitry includes a channel converter configured to convert the frequency of the received pilot signal to a digital value, the frequency error of the common reference signal determined using the digital value.

5. The mobile terminal of claim 1, comprising
an antenna connection interface configured to enable connection to an antenna for reception of the one or more incoming communications from the antenna and transmission of the one or more outgoing communications to the antenna, and
a radio connection interface configured to enable connection to a mobile radio for reception of the one or more outgoing communications from the mobile radio and transmission of the one or more incoming communications to the mobile radio.

6. A mobile terminal for enabling radio communications using software controlled mapping of frequencies, comprising:
   a common reference device configured to provide a common reference signal for frequency conversions;
   frequency conversion circuitry configured to use the common reference signal from the common reference device to perform a frequency conversion of incoming and outgoing communications, the frequency conversion circuitry including an uplink communication signal path by which one or more outgoing communications are converted from a mobile frequency to a transmission frequency and a downlink communication signal path by which one or more incoming communications are converted from the transmission frequency to the mobile frequency, the mobile frequency being in a VHF or UHF frequency range, the transmission frequency being in an L-band or S-band frequency range; and
   signal tracking circuitry configured to determine a frequency error based on a frequency of an incoming communication signal of an incoming communication and cause an adjustment to the frequency conversion performed by the frequency conversion circuitry based on the frequency error.

7. The mobile terminal of claim 6, wherein
the frequency conversion circuitry is configured to convert the frequency of the incoming communication signal to an intermediate frequency, and
the signal tracking circuitry is configured to determine the frequency error after conversion to the intermediate frequency.

8. The mobile terminal of claim 7, wherein
the signal tracking circuitry includes a frequency converter configured to downconvert the intermediate frequency before determining the frequency error of the common reference signal.

9. The mobile terminal of claim 6, wherein
the signal tracking circuitry includes an error detector configured to determine the frequency error by centering the frequency of the incoming communication signal.

10. The mobile terminal of claim 6, wherein
the signal tracking circuitry includes a channel converter configured to convert the frequency of the incoming communication signal to a digital value, the frequency error of the common reference signal determined using the digital value.

11. The mobile terminal of claim 6, comprising
an antenna connection interface configured to enable connection to an antenna for reception of the one or more incoming communications from the antenna and transmission of the one or more outgoing communications to the antenna, and
a radio connection interface configured to enable connection to a mobile radio for reception of the one or more outgoing communications from the mobile radio and transmission of the one or more incoming communications to the mobile radio.

12. The mobile terminal of claim 6, wherein
the frequency conversion circuitry includes at least one frequency converter configured to convert the transmission frequency of the one or more incoming communications to the mobile frequency and/or convert the mobile frequency of the one or more outgoing communications to the transmission frequency, and
the signal tracking circuitry is configured to cause the adjustment to the frequency conversion performed by the frequency conversion circuitry by causing the adjustment to the at least one frequency converter.

13. The mobile terminal of claim 6, comprising
pilot tracking circuitry configured to determine an additional frequency error of the common reference signal based on a frequency of a received pilot signal and cause an adjustment to the common reference device based on the additional frequency error.

14. A mobile terminal for enabling radio communications using software controlled mapping of frequencies, the mobile terminal comprising
a common reference device configured to provide a common reference signal for frequency conversions;
frequency conversion circuitry configured to use the common reference signal from the common reference device to perform a frequency conversion of incoming and outgoing communications, the frequency conversion circuitry including an uplink communication signal path by which one or more outgoing communications are converted from a mobile frequency to a transmission frequency and a downlink communication signal path by which one or more incoming communications are converted from the transmission frequency to the mobile frequency, the mobile frequency being in a VHF or UHF frequency range, the transmission frequency being in an L-band or S-band frequency range; and
frequency tracking circuitry configured to cause an adjustment to the frequency conversion performed by the frequency conversion circuitry based on a determination of a frequency error.

15. The mobile terminal of claim 14, wherein
the frequency tracking circuitry includes pilot tracking circuitry configured to determine the frequency error based on a frequency of a received pilot signal, and
the frequency tracking circuitry is configured to cause the adjustment to the common reference device based on the frequency error such that the frequency conversion circuitry uses an adjusted common reference signal to perform the frequency conversion of a subsequent incoming or outgoing communication.

16. The mobile terminal of claim 15, wherein
the pilot tracking circuitry includes an error detector configured to determine the frequency error using a fast Fourier Transform algorithm.

17. The mobile terminal of claim 14, wherein
the frequency tracking circuitry includes signal tracking circuitry configured determine the frequency error based on the frequency of an incoming communication signal of an incoming communication, and
the frequency tracking circuitry is configured to cause the adjustment to at least one frequency converter of the frequency conversion circuitry based on the frequency error.

18. The mobile terminal of claim 17, wherein
the signal tracking circuitry includes an error detector configured to determine the frequency error by centering the frequency of the incoming communication signal.

19. The mobile terminal of claim 14, comprising
an antenna connection interface configured to enable connection to an antenna for reception of the one or more incoming communications from the antenna and transmission of the one or more outgoing communications to the antenna, and
a radio connection interface configured to enable connection to a mobile radio for reception of the one or more outgoing communications from the mobile radio and transmission of the one or more incoming communications to the mobile radio.

20. The mobile terminal of claim 6, wherein
the signal tracking circuitry is configured to determine the frequency error each time a new incoming communication is received.

* * * * *